US008832588B1

(12) United States Patent
Kerzner et al.

(10) Patent No.: US 8,832,588 B1
(45) Date of Patent: Sep. 9, 2014

(54) CONTEXT-INCLUSIVE MAGNIFYING AREA

(75) Inventors: Dan Kerzner, McLean, VA (US); Joël Lebrun, Vienna, VA (US); Benjamin Reyes, Fairfax, VA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

(21) Appl. No.: 13/174,399

(22) Filed: Jun. 30, 2011

(51) Int. Cl.
*G06F 3/048* (2013.01)
(52) U.S. Cl.
USPC .......................... 715/781; 715/212; 715/764
(58) Field of Classification Search
CPC .... G06F 17/245; G06F 17/246; G06F 3/0482
USPC ........................... 715/781, 212, 764; 345/173
See application file for complete search history.

(56) References Cited

U.S. PATENT DOCUMENTS

| 5,253,362 | A | * | 10/1993 | Nolan et al. | 1/1 |
| 5,874,965 | A | * | 2/1999 | Takai et al. | 345/667 |
| 6,055,548 | A | * | 4/2000 | Comer et al. | 715/212 |
| 6,138,130 | A | * | 10/2000 | Adler et al. | 715/210 |
| 6,335,738 | B1 | * | 1/2002 | Englefield et al. | 715/744 |
| 6,819,336 | B1 | * | 11/2004 | Nielsen | 715/711 |
| 7,146,562 | B2 | * | 12/2006 | Janssen | 715/220 |
| 7,296,230 | B2 | * | 11/2007 | Fukatsu et al. | 715/711 |
| 7,548,925 | B2 | * | 6/2009 | Bradlee et al. | 1/1 |
| 7,623,129 | B2 | * | 11/2009 | Sagalov | 345/440 |
| 7,634,520 | B1 | * | 12/2009 | Seiler et al. | 1/1 |
| 7,890,257 | B2 | * | 2/2011 | Fyke et al. | 701/431 |
| 8,271,876 | B2 | * | 9/2012 | Brugler et al. | 715/708 |
| 2002/0143826 | A1 | * | 10/2002 | Day et al. | 707/526 |
| 2003/0068088 | A1 | * | 4/2003 | Janakiraman et al. | 382/229 |
| 2004/0205524 | A1 | * | 10/2004 | Richter et al. | 715/503 |
| 2005/0171811 | A1 | * | 8/2005 | Campbell et al. | 705/1 |
| 2006/0069696 | A1 | * | 3/2006 | Becker et al. | 707/102 |
| 2006/0104276 | A1 | * | 5/2006 | Naick et al. | 370/392 |
| 2008/0016041 | A1 | * | 1/2008 | Frost et al. | 707/3 |
| 2008/0082938 | A1 | * | 4/2008 | Buczek | 715/784 |
| 2008/0136785 | A1 | * | 6/2008 | Baudisch et al. | 345/173 |
| 2008/0215552 | A1 | * | 9/2008 | Safoutin | 707/3 |
| 2009/0002326 | A1 | * | 1/2009 | Pihlaja | 345/173 |

(Continued)

OTHER PUBLICATIONS

'Internet Archive: Wayback Machine,' [online]. "Make items on the screen appear bigger (Magnifier)," 2009, [retrieved on Mar. 7, 2013]. Retrieved from the Internet: web.archive.org/web/20090712043459/ http://windows.microsoft.com/en-us/Windows7/Make-items-on-the-screen-appear-bigger-Magnifier, 3 pages.
'Telefonica,' [online]. "Telefonica and RIM Launch the New BlackBerry Pearl 8120 Smartphone in Spain," Oct. 2007. [retrieved on Mar. 7, 2013]. Retrieved from the Internet: www.marketwire.com/press-release/telefonica-and-rim-launch-the-new-blackberry-pearl-8120-smartphone-in-spain-nasdaq-rimm-776818.htm, 4 pages.

(Continued)

*Primary Examiner* — Tadeese Hailu
*Assistant Examiner* — Asteway T Gattew
(74) *Attorney, Agent, or Firm* — Fish & Richardson P.C.

(57) ABSTRACT

Methods, systems, and apparatus, including computer programs encoded on a computer storage medium, for displaying a context-inclusive magnification area. In one aspect, a method can include receiving input indicating a user preference for magnification of content. Content that corresponds to the preference can be identified. One or more contextual content elements that are not adjacent to the selected content in the user interface and that are determined to provide context to the selected content can be identified. A magnification area on the user interface of the computing device that includes at least the selected graphical content and the one or more contextual content elements can be displayed.

23 Claims, 10 Drawing Sheets

(56) References Cited

U.S. PATENT DOCUMENTS

| | | | |
|---|---|---|---|
| 2009/0040240 A1* | 2/2009 | Grotjohn et al. | 345/689 |
| 2009/0042542 A1* | 2/2009 | Dias | 455/412.1 |
| 2010/0235729 A1* | 9/2010 | Kocienda et al. | 715/255 |
| 2010/0259500 A1* | 10/2010 | Kennedy | 345/173 |
| 2010/0283800 A1* | 11/2010 | Cragun et al. | 345/661 |
| 2011/0043453 A1* | 2/2011 | Roth et al. | 345/173 |
| 2011/0141031 A1* | 6/2011 | McCullough et al. | 345/173 |
| 2011/0283228 A1* | 11/2011 | Hiraiwa et al. | 715/808 |
| 2012/0030567 A1* | 2/2012 | Victor | 715/702 |
| 2012/0030618 A1* | 2/2012 | Leong et al. | 715/810 |
| 2012/0036455 A1* | 2/2012 | Holt et al. | 715/753 |
| 2012/0174024 A1* | 7/2012 | Safoutin | 715/781 |
| 2012/0180002 A1* | 7/2012 | Campbell et al. | 715/863 |

OTHER PUBLICATIONS

'Got Know How,' [online]. "How to Move & Position the Cursor within Text on iPhone," Feb. 2010, [retrieved on Mar. 7, 2013]. Retrieved from the Internet: www.gotknowhow.com/articles/move-position-cursor-text-iphone, 3 pages.

'In To Mobile,' [online]. "iCanSee Application Converts iPhone Into Magnifying Glass," Oct. 2009, [retrieved on Mar. 7, 2013]. Retrieved from the Internet: www.intomobile.com/2009/10/03/icansee-application-converts-iphone-into-magnifying-glass/, 6 pages.

'iLounge,' [online]. "iPhone 3.0: Cut+Paste, Voice Memos, MMS, Search, and App Updates," Mar. 2009, [retrieved on Mar. 7, 2013]. Retrieved from the Internet: www.ilounge.com/index.php/news/comments/16454/, 5 pages.

* cited by examiner

FIG. 3

Figure 4:
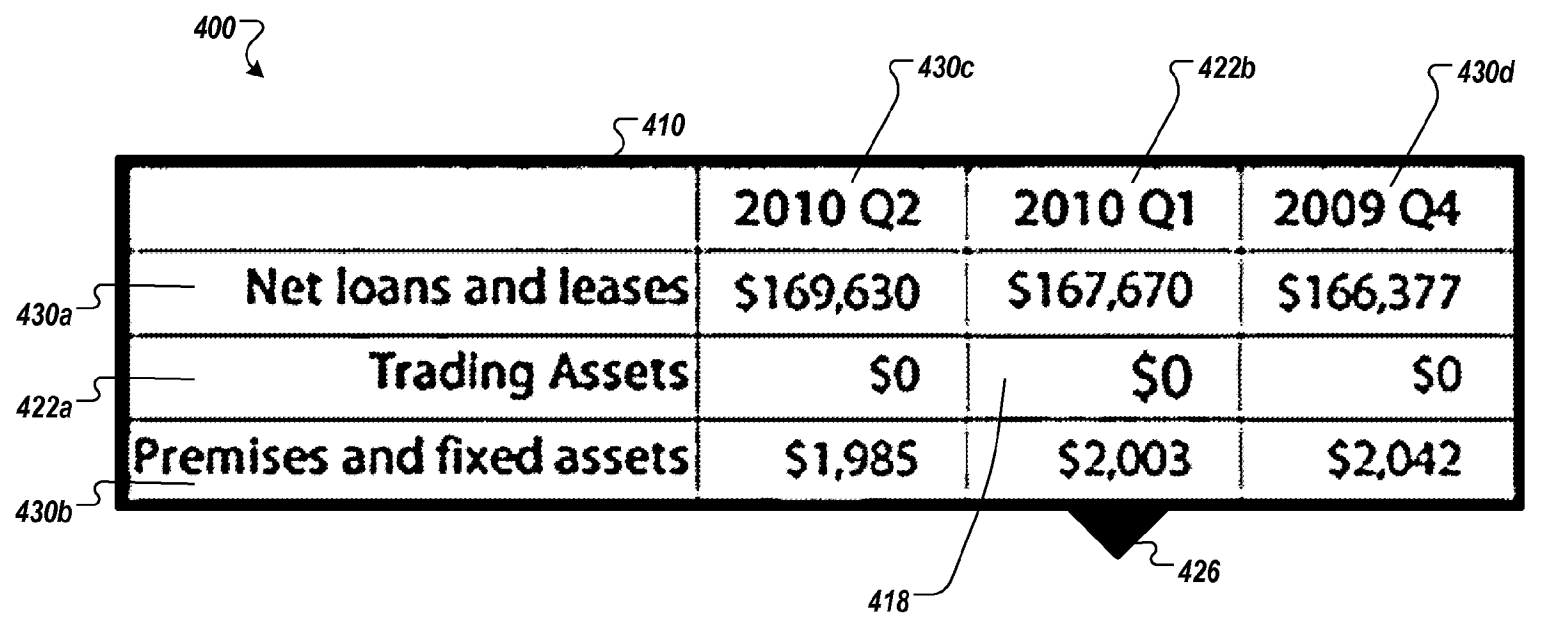

| | 2010 Q2 | 2010 Q1 | 2009 Q4 |
|---|---|---|---|
| Net loans and leases | $169,630 | $167,670 | $166,377 |
| Trading Assets | $0 | $0 | $0 |
| Premises and fixed assets | $1,985 | $2,003 | $2,042 |

CONTEXT-INCLUSIVE MAGNIFYING AREA

TECHNICAL FIELD

This document generally describes techniques, methods, systems, and computer program products for displaying a context-inclusive magnification area.

BACKGROUND

Users can interact with computing devices, such as laptop computers, desktop computers, mobile computing devices (e.g., smartphones, cell phones, personal digital assistants (PDA)), netbooks, and/or tablet computing devices, in a variety of ways. For example, users can input information to a computing device using a pointing device, such as a mouse or touchpad, a keyboard, or another device. Computing devices can include displays to visually present information to users. Some computing devices can include a touchscreen that displays information and receives input through users touching or contacting the touchscreen (e.g., a user touching the touchscreen with his/her finger). When a user touches a touchscreen with a finger or stylus, a computing device can detect and interpret the contact as input.

SUMMARY

This document describes techniques, methods, systems, and computer program products for generating and displaying context-inclusive magnification areas on a computing device. Content can be displayed in magnification areas using various magnification factors (e.g., 1.2×, 1.5×, 2.0×) so that the content is presented in the magnification area with a larger size than it appears outside the magnification area. Content can be identified for magnification based on user input that indicates a user preference to have particular content magnified, such as a user touching a portion of a touchscreen where the particular content is being displayed. Magnification areas can additionally display contextual elements that provide context to content that is being magnified in a magnification area. Contextual elements can include content that is being displayed in a user interface with content that is being magnified, but the contextual elements may not be adjacent to the magnified content in the user interface. For example, a user can select a cell of a spreadsheet for magnification and a magnification area can be displayed to the user that includes the selected cell as well as row and column headers (example contextual elements) for the selected cell.

In one implementation, a method includes receiving, at a computing device, input indicating a user preference for magnification of content displayed on a user interface of the computing device; and identifying content displayed in the user interface that corresponds to the preference and designating the content as selected content. The method can further include identifying one or more contextual content elements that are not adjacent to the selected content in the user interface and that are determined to provide context to the selected content; and displaying a magnification area on the user interface of the computing device that includes at least the selected graphical content and the one or more contextual content elements, wherein display sizes of the selected content and the one or more contextual content elements are increased within the magnification area.

Embodiments can optionally include one or more of the following features. The one or more contextual content elements can be displayed in the user interface. The selected content can be a cell of a spreadsheet in the user interface and the one or more contextual content elements represent a column or row header for the cell. The one or more contextual content elements can describe data represented by the selected content. The one or more contextual content elements can represent information based on a structure of a relational database. A type of data represented by the selected content can be identified and the one or more contextual content elements can be selected based on the identified type of data.

The input can indicate that a user has touched a touchscreen of the computing device. Input can be received indicating that the user is no longer touching the touchscreen and, in response to receiving such input indicating that the user is no longer touching the touchscreen, a determination can be made as to whether one or more actions are associated with the selected content. Based on such a determination of whether one or more actions are associated with the selected content, (i) the magnification area can be hid and one or more selectable display elements for the one or more actions can be displayed, or (ii) the magnification area can continued to be displayed after the user is no longer touching the touchscreen. The one or more actions can include a drill-down action that causes data that was used to generate information displayed in the selected content to be retrieved and displayed. Input that indicates that the user has selected one of the selectable display elements associated with the drill-down action can additionally be received; in response to receiving the input selecting the drill-down action for the selected content, at least a portion of the data used to generate the information displayed in the selected content can be retrieved; and the retrieved data can be displayed on the user interface on the computing device.

The input can indicate that the user touched the touchscreen at a first location that corresponds to the selected content. While the magnification area is displayed, input indicating that the user has touched the touchscreen at a second location that is different than the first location can be received; and second selected content that corresponds to the second location can be identified. One or more second contextual content elements that are not adjacent to the second selected content in the user interface and that are determined to provide context to the second selected content can be identified; and the magnification area can be updated to display the second selected content and the one or more second contextual elements instead of the selected content and the one or more contextual elements previously displayed in the magnification area.

An area of the user interface that is obscured by the user's hand can be estimated based on at least the received input indicating that the user has touched the touchscreen of the computing device; and a display location at which to display the magnification area so that the magnification area is visible to the user can be determined based on the estimated area of the touchscreen that is obscured by the user's hand, where the magnification area is displayed at the determined display location on the touchscreen of the computing device.

In another implementation, a system includes a computing device; a touchscreen of the computing device to receive input indicating a user preference for magnification of content displayed on a user interface of the computing device; and an input processing module to identify content displayed in the user interface that corresponds to the preference; a contextual element identifier to identify one or more contextual content elements that are not adjacent to the selected content in the user interface and that are determined to provide context to the selected content. The system can further include a magnification module to display a magnification area on the user interface of the computing device that includes at least the selected graphical content and the one or more contextual content elements, wherein display sizes of the selected content and the one or more contextual content elements are increased within the magnification area.

Embodiments can optionally include one or more of the following features. The selected content can be a cell of a spreadsheet in the user interface and the one or more contextual content elements represent a column or row header for the cell. The input can indicate that a user has touched a touchscreen of the computing device and the touchscreen is further configured to receive input indicating that the user is no longer touching the touchscreen, and the input processing module can be further configured to, in response to receiving the input indicating that the user is no longer touching the touchscreen, determine whether one or more actions are associated with the selected content. The magnification module can further be configured to continue displaying the magnification area after the user is no longer touching the touchscreen in response to determining that one or more actions are not associated with the selected content. The system can also include an action module to hide the magnification area and to display one or more selectable display elements for the one or more actions in response to determining that one or more actions are associated with the selected content.

The one or more actions can include a drill-down action that causes data that was used to generate information displayed in the selected content to be retrieved and displayed. The touchscreen can further be configured to receive input that indicates that the user has selected one of the selectable display elements associated with the drill-down action. The system can also include a drill-down module to (i) retrieve at least a portion of the data used to generate the information displayed in the selected content in response to receiving the input selecting the drill-down action for the selected content, and (ii) display the retrieved data in the user interface on the computing device.

The details of one or more embodiments of the invention are set forth in the accompanying drawings and the description below. Various advantages can be provided by the disclosed techniques, methods, systems, and computer program products. For example, users can view selected content in a user interface in an increased display size. Users can view contextual content with the selected content even when the contextual content is not adjacent to the selected content. Users can more easily select content in the user interface. For instance, if a user is navigating through a large document that includes many rows and columns of information, it may be difficult for a user to know which row and/or column pertain to one or more cells that are being magnified within a magnification area. By identifying and displaying contextual elements within a magnification area, a user can more quickly determine what the selected content is and whether the selected content is what the user is interested in viewing. Users with impaired vision can have improved accessibility to contents displayed on a screen using magnification areas. Magnification areas can also allow multiple users how are viewing the same document (e.g., the same spreadsheet) on multiple devices to highlight a specific area of such a document to enable collaboration and discussion among the users.

Other features and advantages of the invention will become apparent from the description, the drawings, and the claims.

BRIEF DESCRIPTION OF THE DRAWINGS

FIG. 3 is a diagram illustrating a user interface displaying the context-inclusive magnification area of FIG. 1.

FIG. 4 is a diagram illustrating another example of a context-inclusive magnification area.

FIGS. 5A to 5C are diagrams illustrating examples of changes to a magnification area in response to selections at different locations of a user interface.

FIGS. 6, 7, and 8 are diagrams illustrating additional user interfaces displaying other examples of context-inclusive magnification areas.

DETAILED DESCRIPTION

This document generally describes techniques, methods, systems, and computer program products for displaying a context-inclusive magnification area. When a user indicates a preference for magnification of content, selected content corresponding to the preference can be identified and displayed within a magnification area. One or more contextual content elements, determined to provide context to the selected content, can also be identified and displayed in a magnification area, regardless of whether the contextual content elements are adjacent to the selected content. For example, when a computing device displays a spreadsheet, the selected content can be a particular cell of the spreadsheet and the contextual content elements can be row or column headers for the particular cell. A magnification area can be displayed to include the selected content and the contextual content elements. Such magnification areas can provide an enhanced user experience whereby users can more easily view and understand the context of selected content.

Input indicating a user preference for magnification can cause content in a user interface to become selected (e.g., highlighted and/or assigned as active) for one or more applications. When selection is performed using a touchscreen, selection of a particular content element may be challenging because the size of the user's fingertip may be large compared to the size of elements in a user interface. The magnification area can aid the user to make accurate selections by indicating which content is selected. For instance, content that is selected by a user can be magnified by a magnification factor (e.g., 1.2×) that is greater than another magnification factor (e.g., 1.1×) that is applied to other content displayed within a magnification area. When the user adjusts the preference for magnification, for example, by touching different portions of a touchscreen, the magnification area can be updated to display newly selected content and corresponding contextual content elements. For instance, a user can move his/her finger across a touchscreen and the magnification area can be dynamically adjusted to display the selected content and associated contextual content in response to the movement of the user's finger.

Figure 1:
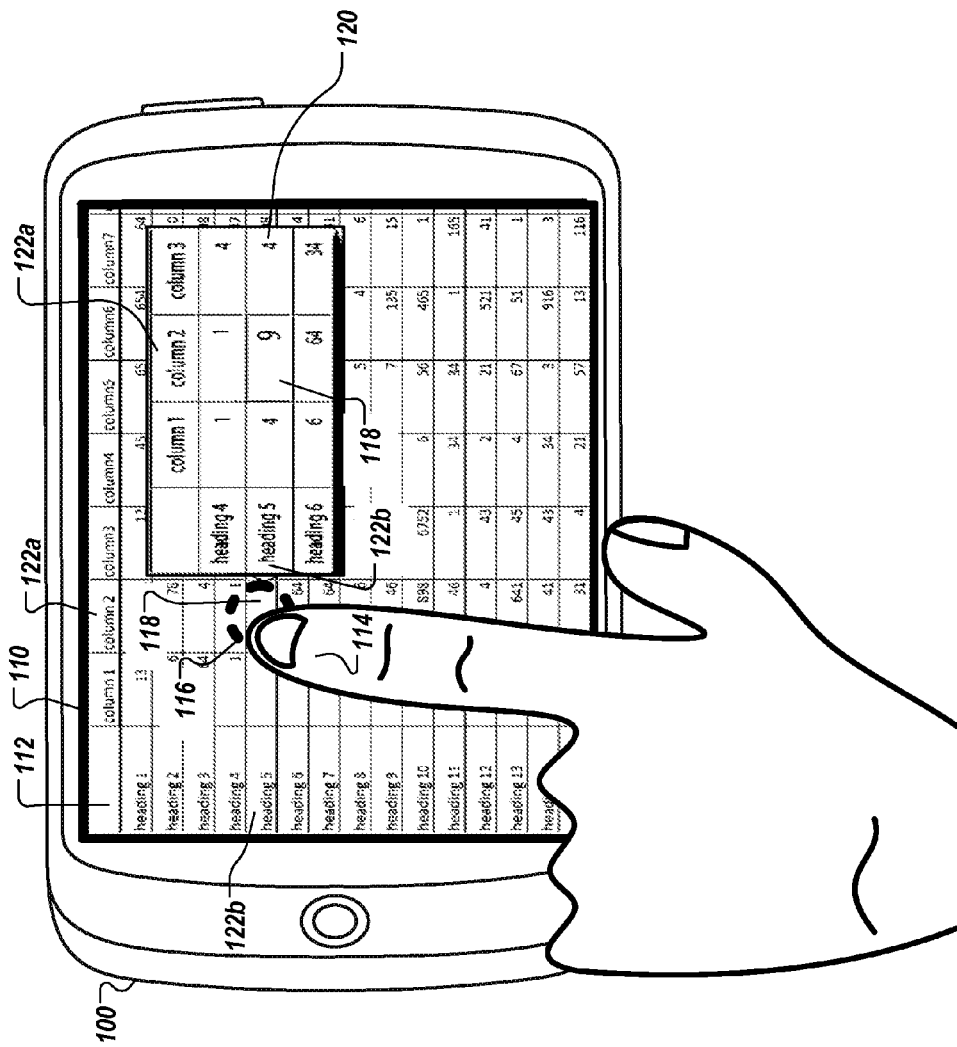
FIG. 1 is a conceptual diagram of an example computing device displaying a context-inclusive magnification area.

FIG. 1 is a conceptual diagram of an example computing device 100 displaying a context-inclusive magnification area 120. In the depicted example, the computing device 100 includes a touchscreen 110, such as a capacitive touchscreen. The touchscreen 110 displays a user interface 112, which includes a rendering of a spreadsheet. Through contact with the touchscreen 110, or through other types of input, the user can enter commands, select elements of the user interface 112, and/or provide other inputs to the computing device 100. When the user touches the touchscreen 110, the computing device 100 can detect that a contact occurred and can identify the location (and/or surface area) where contact with the touchscreen 110 occurred.

In the depicted example, the user touches the touchscreen 110 with his/her finger 114 while the user interface 112 is displayed on the touchscreen 110. In response to receiving the touch input, the computing device 100 displays the magnification area 120. To display the magnification area 120, the computing device 100 identifies the location 116 at which the user touched the touchscreen and identifies content of the user interface 112 that corresponds to the location 116. For example, the computing device 100 identifies a spreadsheet cell at the location 116 as the selected content element 118. The computing device 100 can also identify one or more contextual content elements 122a-b that are determined to provide context for the selected content element 118. For example, the computing device 100 can select the column and row headers corresponding to the selected content element 118 as the contextual content elements 122a-b. Contextual content elements can include a variety of content elements that are provided in a user interface with the selected content, such as the contextual content elements 122a-b that are provided in the user interface 112. For example, The computing device 100 displays the magnification area 120 in the user interface 112, for example, located near the contacted location 116. To aid the user to view and select a content element, the display size of the selected content element 118 is increased in the magnification area 120 (e.g., larger than initial display size of the selected content element 118 in the user interface 112). The magnification area 120 also displays the contextual content elements 122a-b with an increased display size. The contextual content elements 122a-b can indicate, for example, the position of the selected content element 118 in the user interface 112 relative to other data and/or information about the data represented by the content element 118. For instance, the contextual content elements can describe the data presented in the content element 118, such as a description of how the data was generated and/or a description of one or more sources for the data.

As described in greater detail below, the magnification area 120 can be offset from the location 116 at which the user's finger 114 touched the touchscreen 110 of the computing device 100 so that it is not obscured by the user's finger 114 or hand. The offset of the magnification area 120 can also be configured so that the magnification area 120 does not hide or obscure the location 116 where the user is touching the touchscreen 110. The user can additionally drag his/her finger 114 across the touchscreen 110 and the magnification area 120 will be updated to include magnified content and contextual content corresponding to a new location that the user's finger is touching. The location in the user interface 112 at which the magnification area 120 is displayed can additionally be adjusted as the location 116 at which the finger 114 is touching the touchscreen 110 is changed by the user dragging his/her finger 114 across the touchscreen 110 so that the magnification area 120 is visible to the user and/or so that the magnification area 120 is not covering the location 116. By dynamically adjusting the content and associated contextual content displayed in the magnification area 120, a user can more easily navigate and locate particular data that the user interested in on the touchscreen 110.

Figure 2:
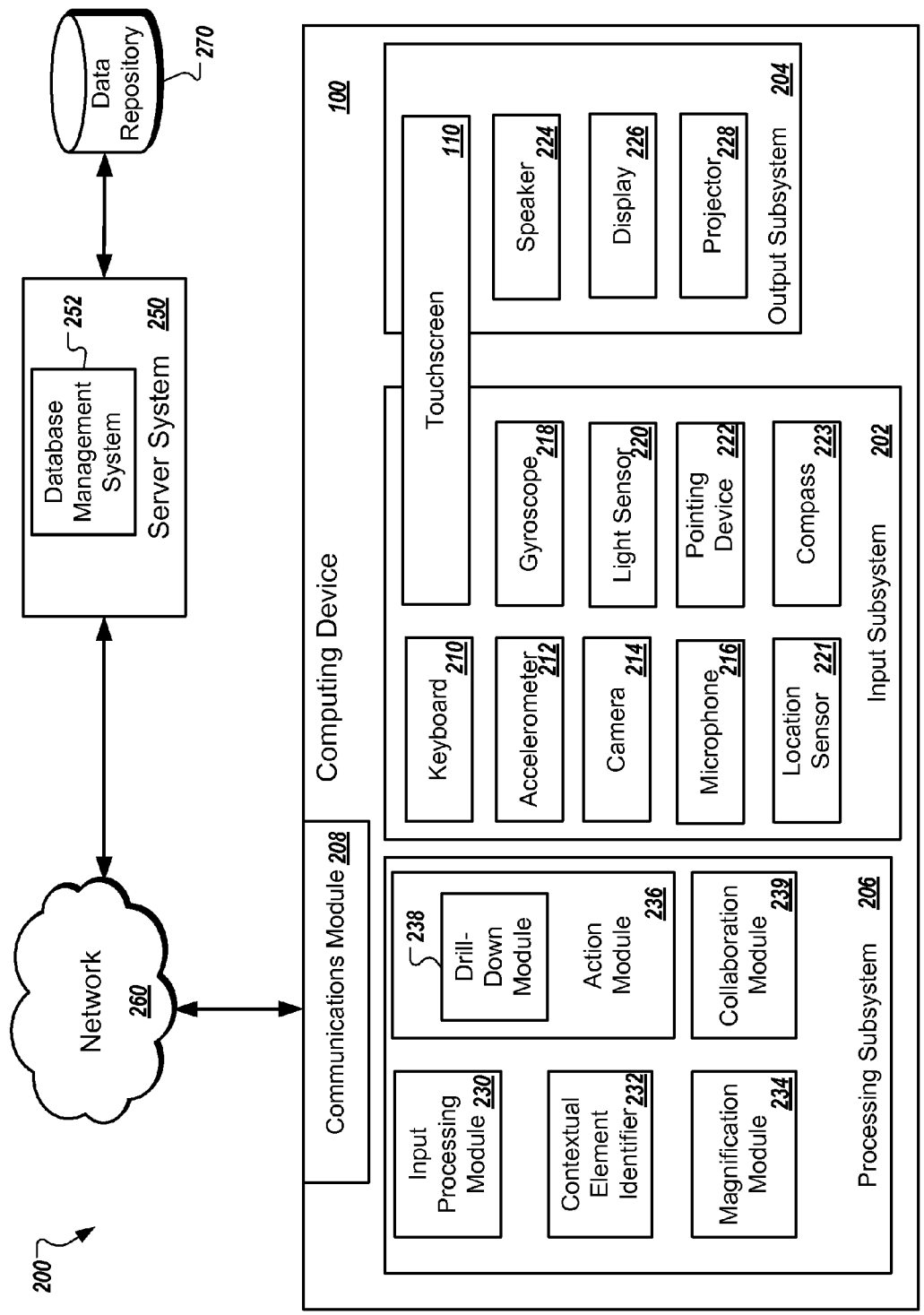
FIG. 2 is a block diagram of an example system for displaying a context-inclusive magnification area.

FIG. 2 is a block diagram of an example system 200 for displaying a context-inclusive magnification area. The system 200 includes the computing device 100 and a server system 250, which can communicate with each other over one or more networks 260, such as the Internet, LAN, wide area network (WAN), virtual private network (VPN), wireless network, cellular network, 3G/4G network, fiber optic network, or any combination thereof. The computing device 100 can be any of a variety of appropriate computing devices, such as a smartphone, a tablet computing device, a laptop, a desktop computer, and/or a netbook. The server system 250 can be any of a variety of appropriate computer server systems, such as a distributed server system (e.g., a cloud computing system).

The server system 250 can communicate with a data repository 270, such as a database, to provide data to the computing device 100 over the network 260. For example, if a user of the computing device 100 provides input specifying that he/she would like to view airline data, the computing device 100 can provide a request (e.g., a query) for such data to the server system 250 and the server system 250 can locate and provide the requested data to the computing device 100 over the network 260. The server system 250 can include a database management system 252 to receive requests for information from the computing device 100, retrieve appropriate information from the data repository 270, and provide the retrieved data to the computing device 100. In some implementations, the server system 250 can format retrieved data for display on the computing device 100, for example, by generating a web page or other resource.

The example computing device 100 includes an input subsystem 202, an output subsystem 204, a processing subsystem 206, and a communications module 208. The input subsystem 202 can receive input from one or more users of the computing device 100. The input subsystem can include a variety of input devices, such as the touchscreen 110, a keyboard 210, an accelerometer 212, a camera 214, a microphone 216, a gyroscope 218, a light sensor 220, and a pointing device 222. The input subsystem 202 can also include one or more location sensors 221, such as Global Positioning System (GPS) unit. A location sensor 221 can use various signals, such as GPS satellite signals, cell tower signals, wireless network signal, to determine a location the computing device 100 (e.g., triangulate a geographic position of the computing device 100). The input subsystem 202 can also include a compass 223, to determine an orientation (e.g., North, South) of the computing device 100. The input subsystem 202 can receive input from a user indicating a user preference for magnification of content displayed on the computing device. For example, the user preference can be input by touching the touchscreen 110, pressing a key of the keyboard 210, moving the computing device 100 as sensed by the accelerometer 212 and/or the gyroscope, speaking as detected by the microphone 216, providing visual cues (e.g., facial expressions, eye movement) as sensed through the camera 214, and/or pressing a button of the pointing device 222. The input subsystem 202 can also receive other inputs indicating, for example, a user preference for the magnification area to magnify a different portion of the user interface. Such inputs can be received as gestures, e.g., initiation of contact with the touchscreen 110, various movements during contact with the touchscreen 110, and/or release of contact from the touchscreen 110.

The output subsystem 204 includes the touchscreen 110 and can also include a speaker 224, a display 226, and a projector 228 with which to present information to a user. Information regarding a magnification area can be output to a user of the computing device 100 using one or more of the components of the output subsystem 204. For example, selected content can be displayed in a magnification area on the touchscreen 100 and, in conjunction with the display of content, information describing the selected content can be audibly output using the speaker 224. The communication module 208 can include one or more input/output (I/O) interfaces (e.g., wireless transceiver, Ethernet port) that permit the computing device 100 to communicate over the network 260 with other computing devices, such as the server system 250. For example, the computing device 100 can use the communications module 208 to transmit a request to the server system 250 and receive data provided in response to the request over the network 260.

The processing subsystem 206 can include one or more processors and/or one or more storage devices. The one or more storage devices can store data and can store instructions that, when executed by the one or more processors, cause the one or more processors to perform the operations described for the computing device 100. The processing subsystem 206 can also include an input processing module 230, a context element identifier 232, a magnification module 234, and an action module 236, which can be implemented in hardware, software, firmware, or any appropriate combination thereof.

The input processing module 230 can access input data received by the input subsystem 202 and can identify, for example, content of the user interface 112 corresponding to the received input. The input processing module 230 can determine that a particular input indicates a user preference for magnification of content displayed on the user interface 112. The input processing module 230 can also identify content that corresponds to the preference. For example, the input processing module 230 can access data indicating that a user touched the touchscreen 110 at a particular coordinate location, or that the touch is generally centered at a particular coordinate location of the touchscreen 110. The input processing module 230 can identify content displayed in the user interface that corresponds to the coordinate location corresponding to the touch. For example, if information indicates that a touch is centered at a coordinate location (X, Y), the input processing module 230 can identify a content element displayed in the rendered user interface that includes the coordinate location (X, Y).

The contextual element identifier 232 can identify contextual elements that provide context for content in a user interface. The contextual element identifier 232 can determine, for example, that a particular content element provides context for selected content. The contextual element identifier 232 can select the particular content element as a contextual element for the selected content. The contextual element identifier 232 can also generate contextual content to be provided with selected content based on information associated with the selected content, such as metadata.

The contextual element identifier 232 can select contextual content elements that provide non-spatial context, and are thus not selected based on proximity to another content elements. Rather than indicating nearby content or the position of the content element in the user interface, contextual content elements can indicate a context in which data indicated by or represented by a content element should be interpreted. For example, when a spreadsheet cell indicates a number, a contextual content element for the cell can be selected to indicate, for example, whether the number represents an employee headcount, a volume of product units sold, a number of days before a deadline, a product's average selling price, or another quantity.

As will be described further below, the contextual element identifier 232 can select as contextual elements content elements that are not adjacent in the user interface to selected content. Further, the contextual element identifier 232 can select as contextual elements content elements that are not adjacent in the user interface to selected content or to content elements surrounding the selected content. Thus the contextual element identifier 232 can select contextual elements that are not contiguous with a region of the user interface 112 including the selected content.

As an example, the contextual element identifier 232 can determine that a content element provides context for another content element based on the data represented by selected content element and other content elements. When a selected content element represents a value selected from a field of a database, for example, the contextual element identifier 232 can determine that a content element provides context based on a variety of information, such as the structure of the database. For example, a content element can be identified to provide context when it represents a name or a description of a table or a column for the database field represented by the selected content element. Thus the contextual element identifier 232 can determine that a first content element provides context for a second content element by determining that the source of the data represented by the first content element has a particular relationship with the source of data represented by the second content element.

The contextual element identifier 232 can also determine that a first content element provides context for a second content element based on metadata for the content elements. For example, the contextual element identifier 232 can access metadata indicating that a first content element can be selected as providing context for a second content.

As another example, the contextual element identifier 232 can determine that, for a particular content element displayed in the user interface 112, one or other content elements provide context based on their graphical characteristics. The graphical characteristics can include, for example, commonalities in color, shape, or other properties between the selected content element and the other content elements, and spatial position in the user interface, such as location at a particular distance from, or alignment vertically or horizontally with or location within a particular row or column, the selected element.

The contextual element identifier 232 can additionally or alternatively identify a content element as providing context based on the data type (e.g., number, date, text), unit measure (e.g., dollars, units sold, time elapsed), or value of the data represented by the selected content element. For example, the contextual element identifier 232 can determine that a content element that indicates an exchange rate provides context for a content element when the content element displays or represents data including a dollar sign or other currency symbol.

The content elements identified by the contextual element identifier 232 can be content elements displayed in the user interface 112, or can be content elements not currently displayed in the user interface 112. The context element identifier 232 can generate contextual elements for a selected content element, for example, generating a contextual element that represents a summary of one or more attributes of data represented by the selected content element.

The contextual element identifier 232 can additionally and/or alternatively identify content elements based on input received through the input subsystem 202, such as audio input from the microphone 216, visual input from the camera 214, and/or location information from the location sensor 221. For example, the contextual element identifier 232 can identify contextual information based on a current location of the computing device 100 using the location sensor 221 and/or the compass 223, and can overlay the contextual information on top of an image obtained from the camera.

The magnification module 234 can manage the display of magnification areas on the computing device 100 based on input received through the input processing module 230 and/or contextual elements identified by the contextual element identifier 232. For instance, the magnification module 234 can designate a magnification area for display on the computing device 100 that includes magnification of the selected content and/or the identified contextual content. The magnification module 234 can generate data that, when rendered by the computing device 100, presents selected content and contextual content elements with an increased display size in the user interface 112.

The action module 236 can identify actions associated with content. The action module 236 can determine whether any actions are associated with a particular content element and can present selectable action elements for any such associated actions. Selectable action elements can be graphical elements that are associated with actions and that can be selected by a user, such as a graphical menu of actions. By selecting an action element, a user can cause an action corresponding to the selected action element to be performed. The action elements can be displayed in the magnification area, or can be displayed in the user interface after the magnification area is hidden. Actions associated with content can include, for example, "drilling-down" to change the manner in which data is displayed, retrieving data related to the content (e.g., retrieving data that was used to generate the content), or editing data represented by the content.

The action module 236 can include a drill-down module 238 that identifies and performs drill-down actions. The drill-down module 238 can identify dimensions by which content is displayed, and generate options to change the organization of the presented data. Information can be organized according to one or more dimensions. Dimensions can include, for example, categories or aspects such as geography, time, product characteristics, customer characteristics, and organizational roles. Drilling down can alter a level of detail for one or more dimensions. As an example, presentation of sales data may be organized by year, which is a temporal dimension, and by city which is a geographical dimension. After drilling down in the temporal dimension, the sales data can be displayed by financial quarter, rather than by year, presenting a more fine-grained set of data to the user.

The drill-down module 238 can permit the user to add and remove dimension constraints (e.g., remove a constraint by time, or add a constraint by geography) and move within a dimension to a higher or lower level of detail. The drill-down module 238 can generate or modify a Structured Query Language (SQL) query such that data retrieved in response to the query is organized according to user-selected dimensions.

In some implementations, the drill-down module 238 can retrieve at least a portion of the data used to generate the information displayed in the selected content in response to receiving input selecting the drill-down action for the selected content. The drill-down module 238 can also display the retrieved data in the user interface on the computing device 100. The drill-down module 238 can access underlying data in a database (e.g., the data repository 270), whether cached on the computing device 100 or requested and received from the server system 250. For example, where the selected content indicates a sum of multiple values, the drill-down module 238 can access the individual values used to generate the sum and can present the individual values in response to a request to drill down for the selected content.

The processing subsystem 206 can additionally include a collaboration module 239 that collaborates interaction with a document, such as a spreadsheet, a presentation, an image, and/or a word processing document, among multiple computing devices. For instance, the collaboration module 239 can interact with other computing devices so that the same output is provided across all of the computing devices that are collaborating. The collaboration module 239 can cause the output subsystem 204 to be synchronized with one or more other computing devices through the network 260 so that magnification areas can be shared and displayed across multiple computing devices. The collaboration module 239 can determine whether to synchronize computing devices based on a variety of factors, such as user input (e.g., user specifying he/she would like to synchronize the computing device 100 with other devices displaying a particular spreadsheet), location information for the computing device 100 (e.g., location information provided by the location sensor 221—devices that are located within a threshold distance of each other who are displaying the same document can be synchronized), and/or orientation information (e.g., devices that are facing each other and/or facing a common direction can be synchronized).

After a magnification area is displayed, when the input processing module 230 can receive input indicating that a user no longer is touching the touchscreen, the action module 236 can determine whether one or more actions are associated with the selected content. In response to determining that one or more actions are not associated with the selected content, the magnification module 234 can continue displaying the magnification area after the user is no longer touching the touchscreen. In response to determining that one or more actions are associated with the selected content, the action module 236 can hide the magnification area and can display one or more selectable display elements for the one or more actions.

In some implementations, some or all of the operations performed by the processing subsystem 206 can be performed at least in part by the server system 250 which can receive information from the computing device 100 about input received from a user of the computing device 100 and, in response, can process the received input and provide appropriate information to be output on the computing device 100. For example, the server system 250 can receive information indicating a user preference for magnification of a portion of a user interface, and information indicating content that corresponds to the user preference. In response, the server system 250 can perform the functions described for the processing subsystem 206, for example, identifying contextual elements and generating data for a magnification area. The server system 250 can then provide the generated data to the computing device 100 over the network 260, and the computing device 100 can render received data to display a magnification area.

Figure 3:
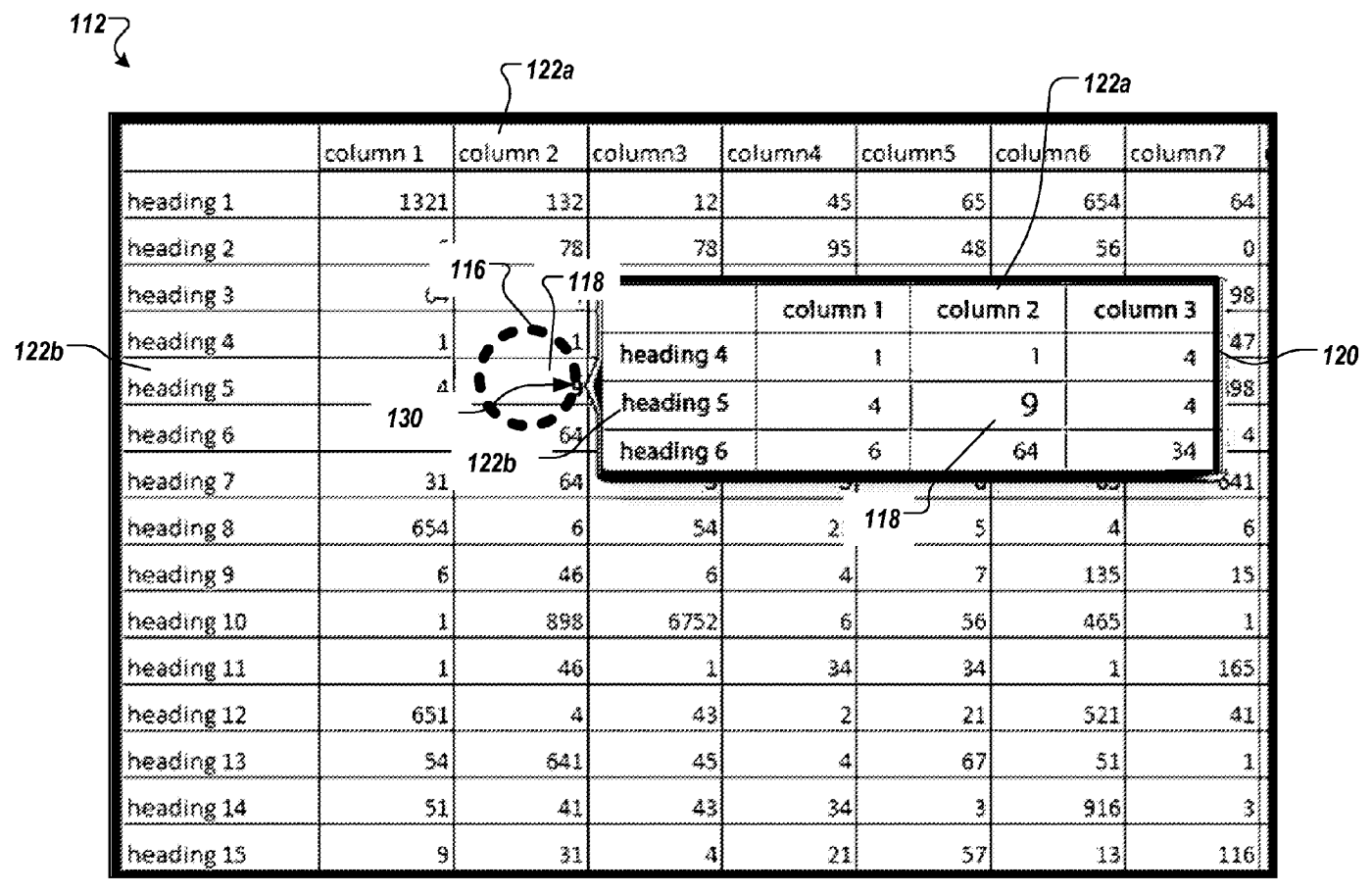

FIG. 3 is a diagram illustrating the user interface 112 displaying the context-inclusive magnification area 120 of FIG. 1. As shown in the depicted example, the magnification area 120 can be displayed at an offset from the selected content element 118, for example, above, below, or to the side of the selected content element 118. When the user touches the touchscreen 110, the user's finger 114 may at least partially obscure the selected content element 118. Even though the location 116 is of interest to the user, the user is likely unable to view the selected content element 118. Because the selected content element 118 in the magnification area 120, offset from the location 116, the user can view the selected content element 118 while the user's finger 114 is still in contact with the touchscreen 110.

The magnification area 120 can include an indicator 130 that identifies the content that is currently selected. For example, the indicator 130 can be an arrow, line, or other marker indicating the position of the selected content element 118 in the user interface 112.

The computing device can select a location in which to display the magnification area 120. For example, the computing device 100 can estimate an area of the user interface that is likely obscured by the user's hand. For example, the computing device 100 can estimate that the user's hand likely obscures a portion of the user interface 112 below the contacted location 116. The computing device 100 can select a location at which to display the magnification area 120 so that the magnification area 120 is located outside the area likely obscured by the user's hand, and will thus likely be visible to the user when displayed in the user interface 112.

In addition to displaying the selected content element 118, the magnification area 120 can display content elements surrounding the selected content element 118 with an increased display size. The surrounding content elements can be displayed in the relative positions that they occur in the user interface 112. When the selected content element 118 is a cell representing data in a spreadsheet, for example, the eight surrounding cells can also be displayed in the magnification area 120. In some implementations, additional content elements can be displayed as a contiguous, enlarged region of the user interface 112. In the magnification area 120, the selected content element 118 can be visually distinguished from surrounding content elements by, for example, distinctive formatting, size, or borders.

Also displayed in the magnification area 120 are the one or more of the contextual content elements 122a-b. The contextual content elements 122a-b can be displayed in the magnification area 120 in association with the selected content element 118. For example, the contextual content elements 122a-b can be labeled or positioned indicate that they to refer to the selected content element 118.

The contextual content elements 122a-b can be elements appearing in the user interface 112, for example, a column header or row header displayed in the user interface 112 before the user touches the touchscreen 110. Alternatively, the contextual content elements 122a-b can be elements that are not displayed in the user interface 112 before the user touches the touchscreen 110. For example, the contextual content elements 122a-b can be generated in response to detecting the contact with the touchscreen 110. The contextual content elements 122a-b can represent information that was displayed in the user interface 112 at the time the user touched the touchscreen 110 or information that was not displayed in the user interface 112 at the time the user touched the touchscreen 110.

The computing device 100 can select as contextual content elements 122a-b content elements that are not adjacent to the selected content element 118 in the user interface 112. For example, the computing device 100 can select contextual content elements 122a-b that are separated from the selected content element 118 in the user interface 112 by at least one content element.

The one or more contextual elements 122a-b selected for display in the magnification area 120 can be non-contiguous with a region of the user interface 112 surrounding the selected content element 118. For example, the selected content element 118 and surrounding content elements (for example, the eight content elements around the selected content element 118) are displayed in the magnification area 120. Outside the magnification area 120, the contextual content element 122b is separated from the selected content element 118 and from the surrounding content elements.

In the same manner that the contextual elements are selected for the selected content element 118, other contextual elements can be selected and displayed to provide context for surrounding content elements displayed in the magnification area 120.

The contextual content elements 122a-b can provide spatial context, for example, indicating the position of the selected content element in the rendered user interface 112. For example, the contextual content elements 122a-b respectively indicate the position of the selected content element 118 in a spreadsheet with a column identifier, "column 2," and a row identifier, "heading 5."

Additionally, or alternatively, the contextual content elements 122a-b can provide context for data represented by the selected content element 118, for example, indicating information that aids interpretation of the data. For example, where the selected content element 118 represents a value from a spreadsheet cell, the contextual content elements 122a-b can indicate, for example, a source of the value, a unit with which the value is measured, the type of metric the value represents (e.g., revenue, profit, or expense), a definition of the metric the value represents, and/or a user or entity responsible for the data. Other examples of context include whether the value is revised, estimated, current, and/or confidential.

Context inclusive magnification areas can be provided for user interfaces providing content other than spreadsheets, as depicted in FIGS. 1 and 3. For example, context inclusive magnifying areas can be provided for a variety of content, such as word processing documents, presentations, charts, graphs, web pages, and/or messages (e.g., email, text messages). For instance, a user can provide input indicating a preference for a portion of a word processing document to be displayed in a magnification area. As a result of the input, a magnification area that includes the selected portion of the word processing document and contextual elements, such as a heading in the document associated with the selected portion and/or a topic sentence for the paragraph of which the selected portion is a part, can be displayed.

FIG. 4 is a diagram illustrating another example of a context-inclusive magnification area 400. The magnification area 400 displays a selected content element 418 and content immediately surrounding the selected content element 418. As context for the selected content element 418, the magnification area 400 displays a contextual element 422a, "trading assets," and a contextual element 422b "2010 Q1," which describe the data represented by the selected content element 418. The contextual elements 422a-b can be, but need not be, row or column identifiers in a user interface. The magnification area 400 also displays additional contextual elements 430a-d, which provide context for the content surrounding the selected content element 418. The magnification area 400 also displays an indicator 426 that can indicate the location that the selected element 418 occurs outside the magnification area 400.

Figures 5A, 5B, 5C:
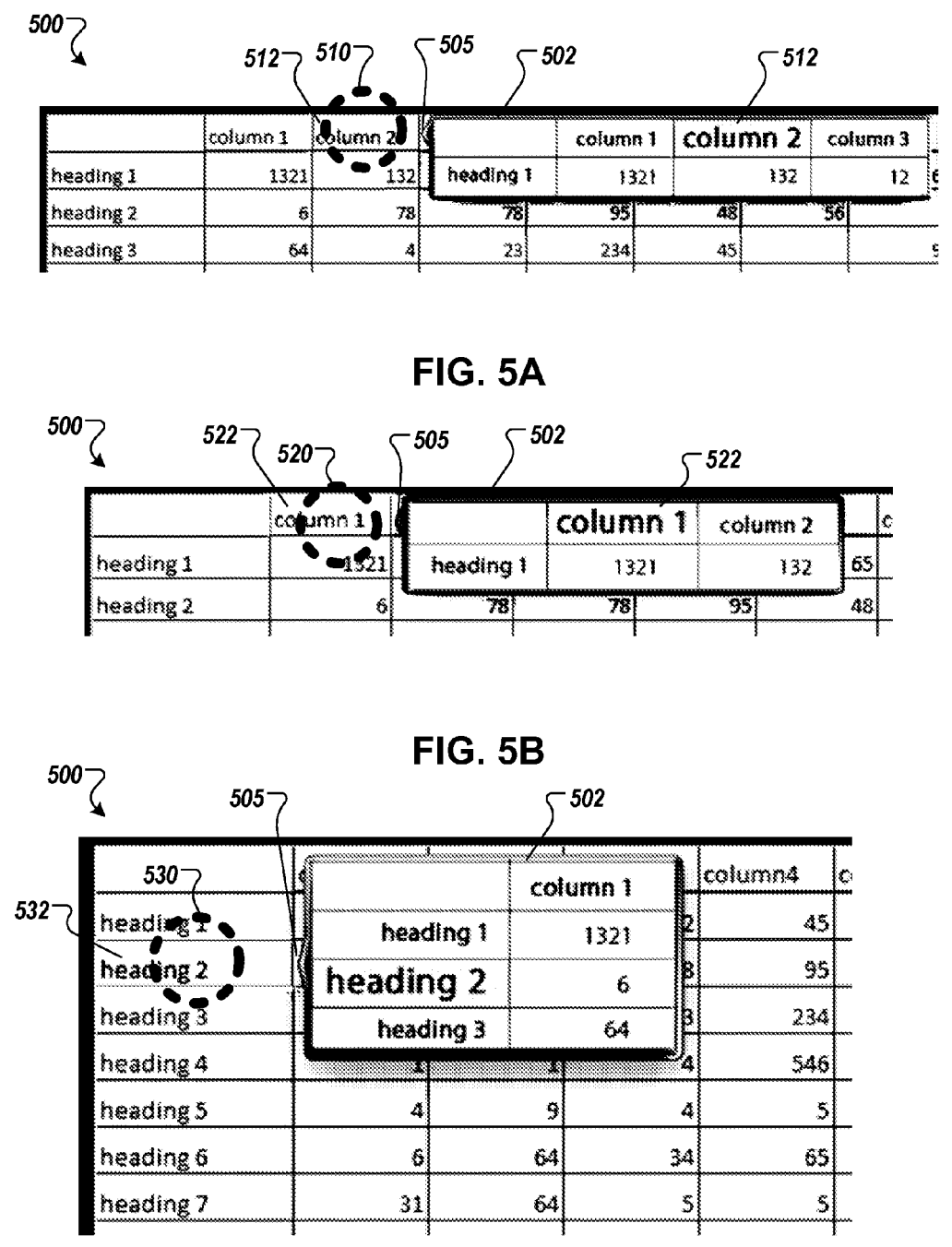

FIGS. 5A to 5C are diagrams illustrating examples of changes to a magnification area 502 in response to selections at different locations of a user interface 500. As a user touches different locations of a touchscreen, for example, by sliding a finger across the touchscreen, different content becomes selected. When selection of content changes, the magnification area can be updated to display the newly selected content and contextual content elements for the newly selected content. The magnification area can also be moved to nearer to the newly selected content.

In the depicted example of FIG. 5A, a user touches a touchscreen displaying the user interface 500 at a location 510 that corresponds to a content element 512. In response to the touch, the content element 512 is selected. The magnification area 502 is displayed in the user interface 500 and includes an enlargement of the selected content element 512 and contextual elements for the content element 512.

From the state illustrated in FIG. 5A, the user touches the touchscreen at a different location 520, which corresponds to a different content element 522. As shown in FIG. 5B, the content element 522 becomes selected and the content element 512 becomes unselected. The magnification area 502 is updated to display the currently selected content element 522 and contextual content elements for the currently selected content element 522. The magnification area 502 is also updated to indicate the location of the selected content element 522 on the user interface 500. For example, the magnification area is moved closer to the selected content element 522 and an indicator 505 is updated to point to the selected content element 522.

To select the content element 522, and thus indicate a preference for magnification of the content element 522, the user can slide a finger from the first location 510 to the second location 520, while maintaining contact with the touchscreen. Alternatively, after touching the touchscreen at the first location 510, the user can break contact with the touchscreen and subsequently touch the touchscreen at the second 520.

In some implementations, multiple content elements may be simultaneously selected and multiple magnification areas can be displayed simultaneously. For example, in response to the touch at the second location 520, rather than updating and moving the magnification area 502, the magnification area 502 can be maintained as shown in FIG. 5A and a second magnification area can be displayed for the selected content element 522. The user interface 500 can thus simultaneously display multiple magnification areas corresponding to different content elements 512, 522. Multiple magnification areas can be displayed in response to a series of contacts or in response to multiple simultaneous contacts in different locations.

From the state of FIG. 5B, the user then touches the touchscreen at a third location 530, which corresponds to a content element 532. As illustrated in FIG. 5C, the content element 532 becomes selected, and the magnification area 502 is updated to display the selected content element 532 and contextual content elements for the selected content element 532.

Figure 6:
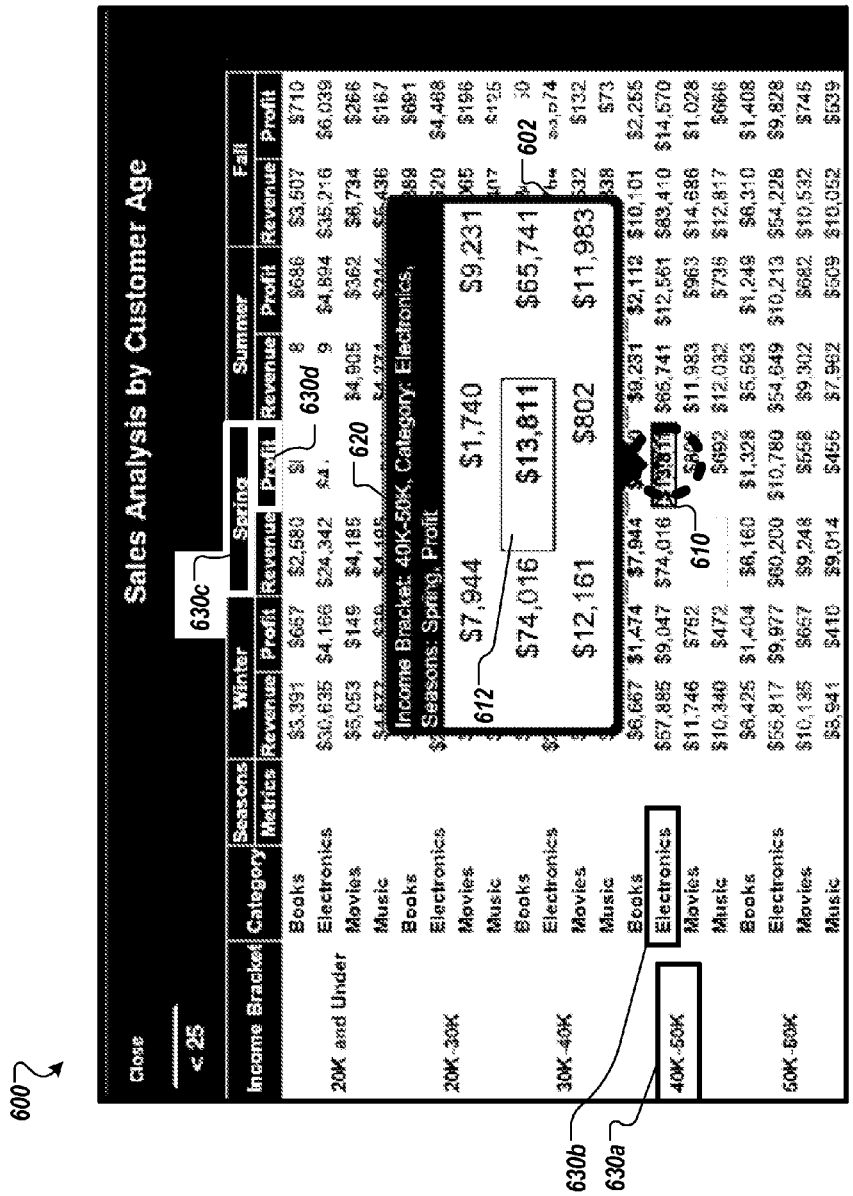

FIG. 6 is a diagram illustrating an additional user interface 600 displaying another example of a context-inclusive magnification area 602. A computing device displaying the user interface 600 receives information indicating a user preference to magnify the content element 610. As depicted in the example interface 600, the selected content element 610 is displayed in the magnification area 602 with an increased size, as indicated by magnified element 612. In response, the computing device identifies contextual information for the content element 610. The computing device generates a contextual content element 620 for the content element 610 and displays the contextual content element 620 in the magnification area 602. In the example of FIG. 6, the contextual content element 620 does not appear in the user interface 600 before the magnification area 602 is displayed.

The computing device can identify the context for the content element 610 using information used to generate the displayed user interface 600. For example, the computing device can select metadata associated with data represented by the content element 610 as context. Similarly, the computing device can select information describing the source of the data represented by the content element 610 as context, for example, information related to a database table, row, or column including the data represented by the content element 610, or a key value associated with the data represented by the content element 610.

The computing device can additionally or alternatively identify the context for the content element 610 based on the position of the content element 610 in the user interface. For example, the computing device determines that the content elements 630a-d in the user interface represent data that provides context for the content element 610, because the content element 610 is located in a region of the user interface associated with the content elements 630a-d.

Figure 7:
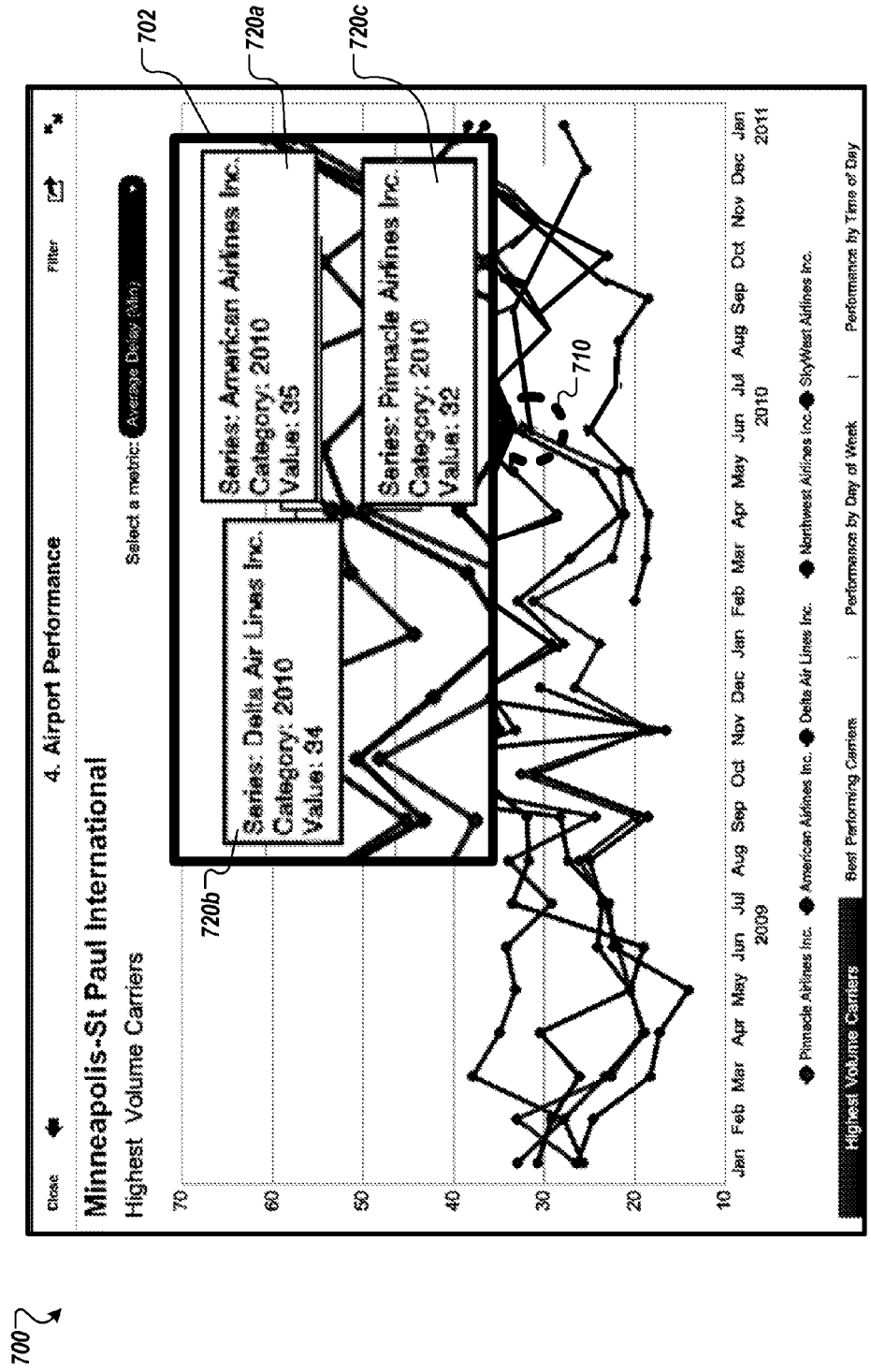

FIG. 7 is a diagram illustrating an additional user interface 700 displaying another example of a context-inclusive magnification area 702. Rather than displaying a spreadsheet representation, the user interface 700 displays a line graph. Content elements of the user interface 700 can include point on lines of the line graph.

In the depicted example, a touchscreen of computing device displays the user interface 700. A user touches the touchscreen at a location 710 to indicate a preference for magnification at that location 710. In response to the contact with the touchscreen, the computing device identifies content in the user interface 700 that corresponds with the preference. For example, the computing device identifies points on the line graph that correspond to the contacted location 710.

In the depicted example, the computing device identifies multiple points on the line graph that are located at the contacted location 710. For example, the computing device can determine that multiple points are located within a threshold distance from the center of the contacted area. Because multiple points may correspond to the user's indicated preference, the computing device can determine that the user's preference for magnification and for selection is ambiguous.

Based on the ambiguous user preference, the computing device can identify contextual information for each of the multiple points at the contacted location 710. The contextual information can include information indicated on the user interface 700, and can also include information not indicated on the user interface. Using the identified information, the computing device generates a contextual content element 720a-c for each point that corresponds to the user's preference. The contextual content elements can indicate, for example, the value of the data represented by the point, information identifying the data series or line that includes the point, a time period corresponding to the data, and other information.

The computing device displays the magnification area 702 in the user interface 700. The magnification area 702 includes a magnified portion of the user interface 700, which includes the set of points corresponding to the user's preference. The magnification area 702 also includes the contextual elements 720a-c that respectively indicate context for each point that correspond to the user's preference.

The contextual content elements 720a-c can be selectable. The user can touch one of the contextual content elements 720a-c to select the point corresponding to one of the contextual content elements 720a-c. In this manner, the user can disambiguate the user's initial preference for selection and magnification. The user's selection of one of the contextual content elements 720a-c can be a second contact that occurs while user maintains contact at the location 710. Once disambiguation has occurred (e.g., through subsequent selection of one of the contextual content elements), the user can then move his/her finger horizontally over the line graph to update the contextual information 702 for the particular line graph that has been selected. This can be very useful to a user who is interested in information associated with a particular line graph when there are multiple line graphs displayed. Additionally, the contextual information 702 can move in the interface 700 with the user's finger to follow the contacted location 710. Alternatively, the user can release contact with the touchscreen, the computing device can continue to display the magnification area 702, and the user can select one of the contextual content elements 720a-c after the contact with the location 710 is released.

Figure 8:
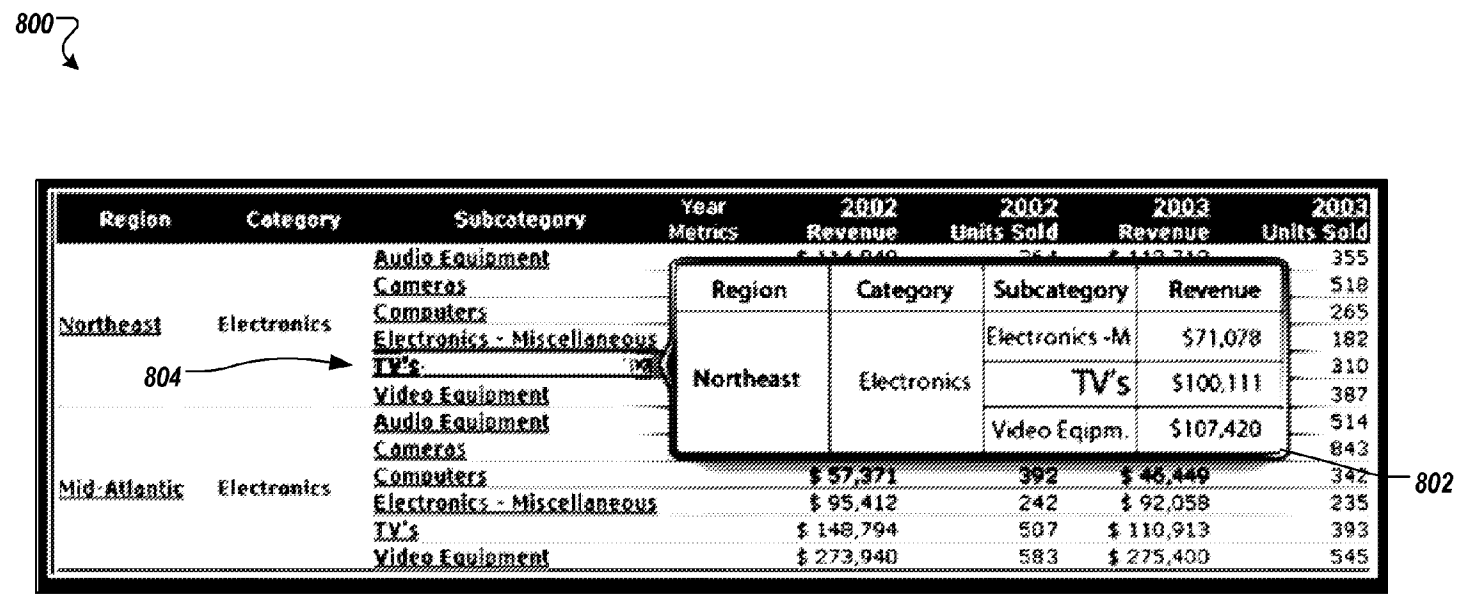

FIG. 8 is a diagram illustrating an additional user interface 800 displaying another example of a context-inclusive magnification area 802. A computing device can select the information to display in the magnification area based on the type of content corresponding to the user's preference for magnification and selection. A computing device can generate a magnification area with a different layout, number of elements, and types of elements when a user selects different types of content. For example, different types of magnification areas can be generated and displayed for spreadsheet cells representing different types of data (e.g., numerical data, textual data). Differences in types of magnification areas displayed can quickly indicate to a user a type of content that is currently selected.

For example, the computing device can determine that a selected content element 804 represents an attribute description. An attribute description can be data indicated by, for example, a row header or column header that describes content elements in the user interface. As a result, the computing device can generate and display the magnification area 802 as illustrated in the user interface 800. For example, content elements that correspond to different attribute descriptions (e.g., Northeast, Electronics—Miscellaneous) are being displayed in the example user interface 800 as separate content elements in the magnification area 802. By contrast, when the computing device determines that a selected content element represents data of a different type, for example, a numerical data value, the computing device can instead display a magnification area as shown in FIG. 7, with a single summary contextual content element.

When the computing device receives information indicating that a user has stopped touching a touchscreen (e.g., the user lifted his/her finger off the touchscreen), the computing device can identify content that corresponds to the location of the last contact with the touchscreen. The content corresponding to the last location of contact can be selected. On the computing device, an operating system or one or more applications can receive information identifying the selected content and, based on the selected content, the computing device can determine whether to perform an action, such as to change or hide the magnification area. Content elements, or types of content elements, can be associated with one or more user selectable actions. The computing device can determine whether the selected content element is associated with one or more selectable actions. If so, the computing device can hide the magnification area and display a list of user selectable options. If no actions are associated with the selected content element, the computing device can continue to display the magnification area on the user interface, or hide the magnification area without displaying selectable options.

For example, a content element representing data for an attribute description can be associated with actions to drill-down on the selected content. In response to selection of a drill-down option by the user, the computing device can display a more detailed drill-down interface or can perform a default drill-down operation. Alternatively, the list of selectable options for a cell can include particular drill-down options based on the data represented by the content element. For example, when a content element represents a year, and thus indicates an attribute description for a temporal dimension, user-selectable options for drilling down in more finely grained areas can be presented (e.g., "display by quarter," "display by month," or "display by week"). An option to drill up (e.g., "display by decade") or remove the dimension (e.g., "remove time constraints") can alternatively be presented. Other actions can include, for example, sorting data in the user interface, changing a view (e.g., from a spreadsheet to a graph), changing a data source, or editing content of the selected content element.

Figure 9:
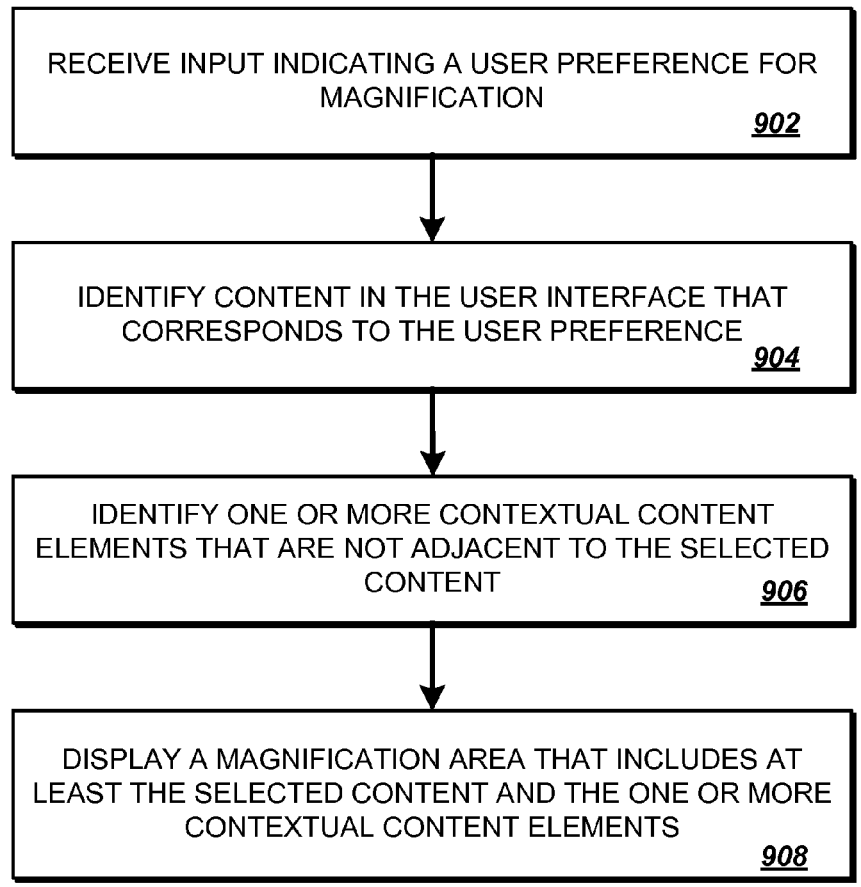
FIG. 9 is a flow diagram illustrating an example process for displaying a context-inclusive magnification area.

FIG. 9 is a flow diagram illustrating an example process 900 for displaying a context-inclusive magnification area. The example process 900 can be performed by any of a variety of appropriate computing devices, such as the computing device 100 described above with regard to FIGS. 1 and 2. The example process 900 can cause one or more context-inclusive magnification areas to be provided on such a computing device, such as the context-inclusive magnification areas described above with regard to FIGS. 1 and 3-8.

At 902, input indicating a user preference for magnification is received. The input can be received at a computing device, and can indicate a preference for magnification displayed on a user interface of the computing device. For example, the input can indicate that a user has touched a touchscreen of the computing device, indicating a user preference for magnification of content displayed on the touchscreen. The input can indicate a particular location in the touchscreen or the user interface corresponding to the user preference, for example, the location where the touchscreen was touched.

At 904, content in the user interface that corresponds to the user preference is identified. The content that corresponds to the user preference can be designated as selected content. For example, when the input indicating the user preference indicates a location in the user interface, content located at the indicated location can be identified as corresponding to the user preference.

At 906, one or more contextual content elements that are not adjacent to the selected content are identified. The one or more contextual content elements can be non-contiguous with the selected content and a larger region about the selected content. The contextual content elements identified can be content elements that are determined to provide context to the selected content.

The process 900 can include selecting one or more contextual content elements that describe data represented by the selected content. For example, the selected content can be a cell of a spreadsheet in the user interface, and the process can include selecting one or more contextual content elements that represent a column or row header for the cell. The process 900 can include selecting one or more contextual content elements that represent information based on a structure of a relational database.

The one or more contextual content elements can be identified from among content elements displayed in the user interface at the time the user indicates the preference for magnification. Alternatively, the contextual content elements can be content elements that are not displayed in the user interface.

Identifying one or more contextual elements can include determining that the contextual elements provide context for the selected content. For example, identifying one or more contextual content elements can include determining that metadata for the contextual content elements or for data represented by the contextual content elements indicates that the contextual content element provides context for the selected content.

Identifying one or more contextual elements can include identifying a type of data represented by the selected content, and selecting the one or more contextual content elements based on the identified type of data.

At 908, a magnification area that includes at least the selected content and the one or more contextual content elements is displayed in the user interface. Display sizes of the selected content and the one or more contextual content elements are increased within the magnification area. For example, the display sizes in the magnification area are larger than the display sizes outside the magnification area.

The process 900 can include estimating an area of the user interface that is obscured by the user's hand based on at least the received input indicating that the user has touched the touchscreen of the computing device, determining a display location at which to display the magnification area so that the magnification area is visible to the user based on the estimated area of the touchscreen that is obscured by the user's hand, and the magnification area can be displayed at the determined display location on the touchscreen of the computing device.

The process 900 can include receiving input indicating that the user is no longer touching the touchscreen. In response to receiving the input indicating that the user is no longer touching the touchscreen, the computing device can determine whether one or more actions are associated with the selected content. Based on the determination of whether one or more actions are associated with the selected content, the computing device can (i) hide the magnification area and displaying one or more selectable display elements for the one or more actions, or (ii) continue to display the magnification area after the user is no longer touching the touchscreen.

The one or more actions can include a drill-down action that causes data that was used to generate information displayed in the selected content to be retrieved and displayed. The process 900 can include receiving input that indicates that the user has selected one of the selectable display elements associated with the drill-down action. In response to receiving the input selecting the drill-down action for the selected content, at least a portion of the data used to generate the information displayed in the selected content can be retrieved, and the retrieved data can be displayed on the user interface on the computing device.

In some implementations, the input can indicate that the user touched the touchscreen at a first location that corresponds to the selected content. While the magnification area is displayed, input indicating that the user has touched the touchscreen at a second location that is different than the first location can be received. Second selected content that corresponds to the second location can be identified. One or more second contextual content elements that are not adjacent to the second selected content in the user interface and that are determined to provide context to the second selected content can be identified. The magnification area can be updated to display the second selected content and the one or more second contextual elements instead of the selected content and the one or more contextual elements previously displayed in the magnification area. For example, first and second locations can correspond to a user touching and dragging his/her finger across a touchscreen from the first location to the second location, which can cause a magnification area to be updated with content and contextual elements, and for the location at which the magnification area is displayed to be updated to track the user's finger.

Figure 10:
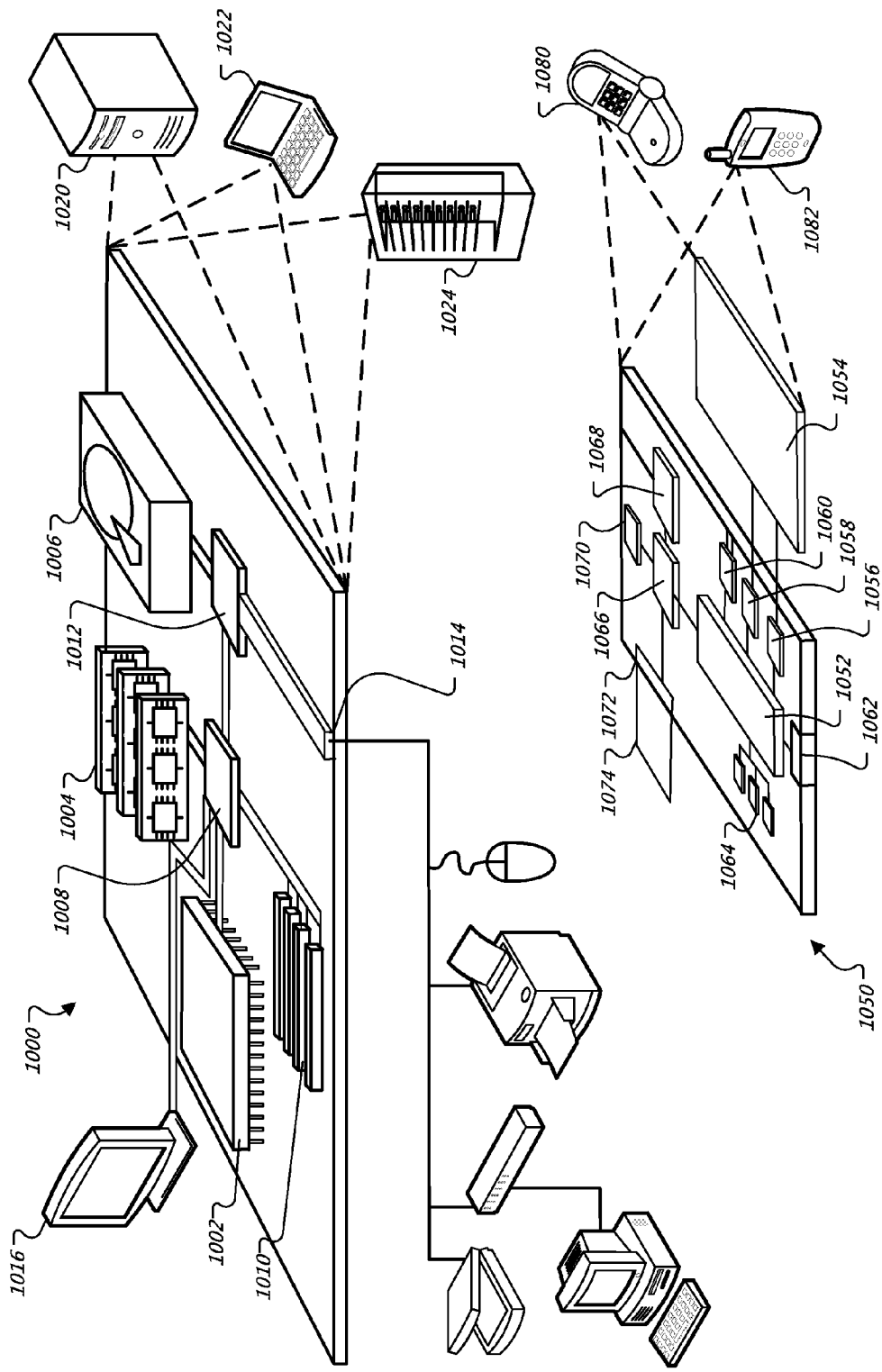
FIG. 10 is a block diagram of computing devices that may be used to implement the systems and methods described in this document, as either a client or as a server or plurality of servers Like reference numbers and designations in the various drawings indicate like elements.

FIG. 10 is a block diagram of computing devices 1000, 1050 that may be used to implement the systems and methods described in this document, as either a client or as a server or plurality of servers. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smartphones, and other similar computing devices. Additionally computing device 1000 or 1050 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT (Thin-Film-Transistor Liquid Crystal Display) display or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052 that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the disclosure. For example, various forms of the flows shown above may be used, with steps re-ordered, added, or removed. Other implementations are within the scope of the following claims.

The invention claimed is:

1. A method, comprising:
   receiving, at a computing device, input indicating a user preference for magnification of content displayed at a first time in a user interface of the computing device;
   identifying content displayed in the user interface that corresponds to the preference and designating the content as selected content;
   identifying, based on the selected content and independent of proximity to the selected content in the user interface, a row heading element and a column heading element that are determined to provide context to the selected content, wherein the row heading element and the column heading element are not adjacent to the selected content in the user interface at the first time; and
   displaying, at a later second time, a magnification area on the user interface of the computing device that includes a combination and arrangement of content comprising: the selected content and the row heading element and the column heading element,
   wherein the row heading element and the column heading element are displayed in the magnification area with the same format and the same orientation relative to the selected content as the row heading element and the column heading element are displayed at the first time in the user interface,
   wherein display sizes of the selected content and the row heading element and the column heading element are increased within the magnification area, and
   wherein the combination and arrangement of content displayed in the magnification area are different from all contiguous areas of content that were displayed in the user interface at the first time.

2. The method of claim 1, wherein the row heading element and the column heading element are displayed in the user interface at the first time.

3. The method of claim 1, wherein the selected content is a cell of a spreadsheet in the user interface.

4. The method of claim 1, wherein the row heading element and the column heading element describe data represented by the selected content.

5. The method of claim 1, wherein the row heading element and the column heading element represent information based on a structure of a relational database.

6. The method of claim 1, further comprising:
   identifying a type of data represented by the selected content; and
   selecting the row heading element and the column heading element based on the identified type of data.

7. The method of claim 1, wherein the input indicates that a user has touched a touchscreen of the computing device.

8. The method of claim 7, further comprising:
   receiving new input indicating that the user is no longer touching the touchscreen;
   in response to receiving the new input indicating that the user is no longer touching the touchscreen, determining whether one or more actions are associated with the selected content;
   based on the determination of whether one or more actions are associated with the selected content, i) hiding the magnification area and displaying one or more selectable display elements for the one or more actions, or ii) continuing to display the magnification area after the user is no longer touching the touchscreen.

9. The method of claim 8, wherein the one or more actions include a drill-down action that causes data that was used to generate information displayed in the selected content to be retrieved and displayed;
   the method further comprising:
      receiving additional input that indicates that the user has selected one of the selectable display elements associated with the drill-down action;
      in response to receiving the additional input selecting the drill-down action for the selected content, retrieving at least a portion of the data used to generate the information displayed in the selected content; and
      displaying the retrieved data on the user interface on the computing device.

10. The method of claim 7, wherein the input indicates that the user touched the touchscreen at a first location that corresponds to the selected content;

the method further comprising:

while the magnification area is displayed, receiving new input indicating that the user has touched the touchscreen at a second location that is different than the first location;

identifying new selected content that corresponds to the second location;

identifying one or more new row heading elements and new column heading elements that are not adjacent to the new selected content in the user interface and that are determined to provide context to the new selected content; and updating the magnification area to display the new selected content and the one or more new row heading elements and new column heading elements instead of the selected content and the row heading element and the column heading element previously displayed in the magnification area.

11. The method of claim 7, further comprising:

estimating an area of the user interface that is obscured by the user's hand based on at least the received input indicating that the user has touched the touchscreen of the computing device; and determining a display location at which to display the magnification area so that the magnification area is visible to the user based on the estimated area of the touchscreen that is obscured by the user's hand;

wherein the magnification area is displayed at the determined display location on the touchscreen of the computing device.

12. A computer program product comprising a tangible and non-transitory computer-readable medium storing instructions that, when executed by a computing device, cause the computing device to perform operations comprising:

receiving, at a computing device, input indicating a user preference for magnification of content displayed at a first time in a user interface of the computing device;

identifying content displayed in the user interface that corresponds to the preference and designating the content as selected content;

identifying, based on the selected content and independent of proximity to the selected content in the user interface, a row heading element and a column heading element that are determined to provide context to the selected content, wherein the row heading element and the column heading element are not adjacent to the selected content in the user interface at the first time; and displaying, at a later second time, a magnification area on the user interface of the computing device that includes a combination and arrangement of content comprising:

the selected content and the row heading element and the column heading element, wherein the row heading element and the column heading element are displayed in the magnification area with the same format and the same orientation relative to the selected content as the row heading element and the column heading element are displayed at the first time in the user interface, wherein display sizes of the selected content and the row heading element and the column heading element are increased within the magnification area, and wherein the combination and arrangement of content displayed in the magnification area are different from all contiguous areas of content that were displayed in the user interface at the first time.

13. The computer program product of claim 12, wherein the selected content is a cell of a spreadsheet in the user interface.

14. The computer program product of claim 12, wherein the row heading element and the column heading element describe data represented by the selected content.

15. The computer program product of claim 12, wherein the input indicates that a user has touched a touchscreen of the computing device; and wherein the operations further comprise:

receiving new input indicating that the user is no longer touching the touchscreen;

in response to receiving the new input indicating that the user is no longer touching the touchscreen, determining whether one or more actions are associated with the selected content;

based on the determination of whether one or more actions are associated with the selected content, i) hiding the magnification area and displaying one or more selectable display elements for the one or more actions, or ii) continuing to display the magnification area after the user is no longer touching the touchscreen.

16. The computer program product of claim 15, wherein the one or more actions include a drill-down action that causes data that was used to generate information displayed in the selected content to be retrieved and displayed;

wherein the operations further comprise:

receiving additional input that indicates that the user has selected one of the selectable display elements associated with the drill-down action;

in response to receiving the additional input selecting the drill-down action for the selected content, retrieving at least a portion of the data used to generate the information displayed in the selected content; and displaying the retrieved data in the user interface on the computing device.

17. A system comprising:

a computing device;

a touchscreen of the computing device to receive input indicating a user preference for magnification of content displayed at a first time on a user interface of the computing device;

an input processing module to identify content displayed in the user interface that corresponds to the preference;

a contextual element identifier to identify, based on the selected content and independent of proximity to the selected content in the user interface, a row heading element and a column heading element that are determined to provide context to the selected content, wherein the row heading element and the column heading element are not adjacent to the selected content in the user interface at the first time; and a magnification module to display, at a later second time, a magnification area on the user interface of the computing device that includes a combination and arrangement of content comprising: the selected content and the row heading element and the column heading element, wherein the row heading element and the column heading element are displayed in the magnification area with the same format and the same orientation relative to the selected content as the row heading element and the column heading element are displayed at the first time in the user interface, wherein display sizes of the selected content and the row heading element and the column heading element are increased within the magnification area, and wherein the combination and arrangement of content displayed in the magnification area is different from all contiguous areas of content that were displayed in the user interface at the first time.

18. The system of claim 17, wherein the selected content is a cell of a spreadsheet in the user interface.

19. The system of claim 17, wherein the input indicates that a user has touched a touchscreen of the computing device and the touchscreen is further configured to receive new input indicating that the user is no longer touching the touchscreen;

wherein the input processing module is further configured to, in response to receiving the new input indicating that the user is no longer touching the touchscreen, determine whether one or more actions are associated with the selected content;

wherein the magnification module is further configured to continue displaying the magnification area after the user is no longer touching the touchscreen in response to determining that one or more actions are not associated with the selected content; and wherein the system further comprises an action module to hide the magnification area and to display one or more selectable display elements for the one or more actions in response to determining that one or more actions are associated with the selected content.

20. The system of claim 19, wherein the one or more actions include a drill-down action that causes data that was used to generate information displayed in the selected content to be retrieved and displayed;

wherein the touchscreen is further configured to receive additional input that indicates that the user has selected one of the selectable display elements associated with the drill-down action; and wherein the system further comprises a drill-down module to i) retrieve at least a portion of the data used to generate the information displayed in the selected content in response to receiving the additional input selecting the drill-down action for the selected content, and ii) display the retrieved data in the user interface on the computing device.

21. The method of claim 1, further comprising:

identifying one or more additional content elements that are displayed in a particular contiguous area of the user interface at the first time that includes the selected content;

wherein:
  the row heading element and the column heading element are not adjacent to the selected content or the one or more additional content elements in the user interface at the first time,
  the row heading element and the column heading element are different from the selected content and the one or more additional content elements, and
  the combination and arrangement of content included in the magnification area further comprises the one or more additional content elements.

22. The computer program product of claim 12, wherein the operation further comprise:

identifying one or more additional content elements that are displayed in a particular contiguous area of the user interface at the first time that includes the selected content; and wherein:
  the row heading element and the column heading element are not adjacent to the selected content or the one or more additional content elements in the user interface at the first time,
  the row heading element and the column heading element are different from the selected content and the one or more additional content elements, and
  the combination and arrangement of content included in the magnification area further comprises the one or more additional content elements.

23. The system of claim 17, wherein:
the contextual element identifier is further configured to identifying one or more additional content elements that are displayed in a particular contiguous area of the user interface at the first time that includes the selected content,
the row heading element and the column heading element are not adjacent to the selected content or the one or more additional content elements in the user interface at the first time,
the row heading element and the column heading element are different from the selected content and the one or more additional content elements, and
the combination and arrangement of content included in the magnification area further comprises the one or more additional content elements.

* * * * *